L. E. WHITON.
CHUCK.
APPLICATION FILED SEPT. 28, 1907.

966,630.

Patented Aug. 9, 1910.
2 SHEETS—SHEET 1.

WITNESSES

INVENTOR
Lucius E. Whiton.
ATTORNEY

L. E. WHITON.
CHUCK.
APPLICATION FILED SEPT. 28, 1907.

966,630.

Patented Aug. 9, 1910.
2 SHEETS—SHEET 2.

WITNESSES
J Clyde Ripley
Alice P. Goeller

INVENTOR
Lucius E. Whiton
BY
ATTORNEY

UNITED STATES PATENT OFFICE.

LUCIUS E. WHITON, OF NEW LONDON, CONNECTICUT.

CHUCK.

966,630.  Specification of Letters Patent.  Patented Aug. 9, 1910.

Application filed September 28, 1907. Serial No. 394,960.

*To all whom it may concern:*

Be it known that I, LUCIUS E. WHITON, a citizen of the United States, residing at New London, in the county of New London and State of Connecticut, have invented certain new and useful Improvements in Chucks, of which the following is a specification.

My invention relates to improvements in chucks and particularly for use where high torque is required. In such cases, the work is sometimes likely to slip and turn in the chuck.

It is my object to prevent this and to enable a better grip to be obtained without straining the jaws or the chuck body.

In its complete and preferred form, the invention contemplates a chuck body with projecting jaws and a frame recessed to accommodate the jaws and provided with auxiliary clamping screws for the work. Screws are also provided for mounting the frame on the jaws and thus securing additional pressure on the work.

Figure 1:
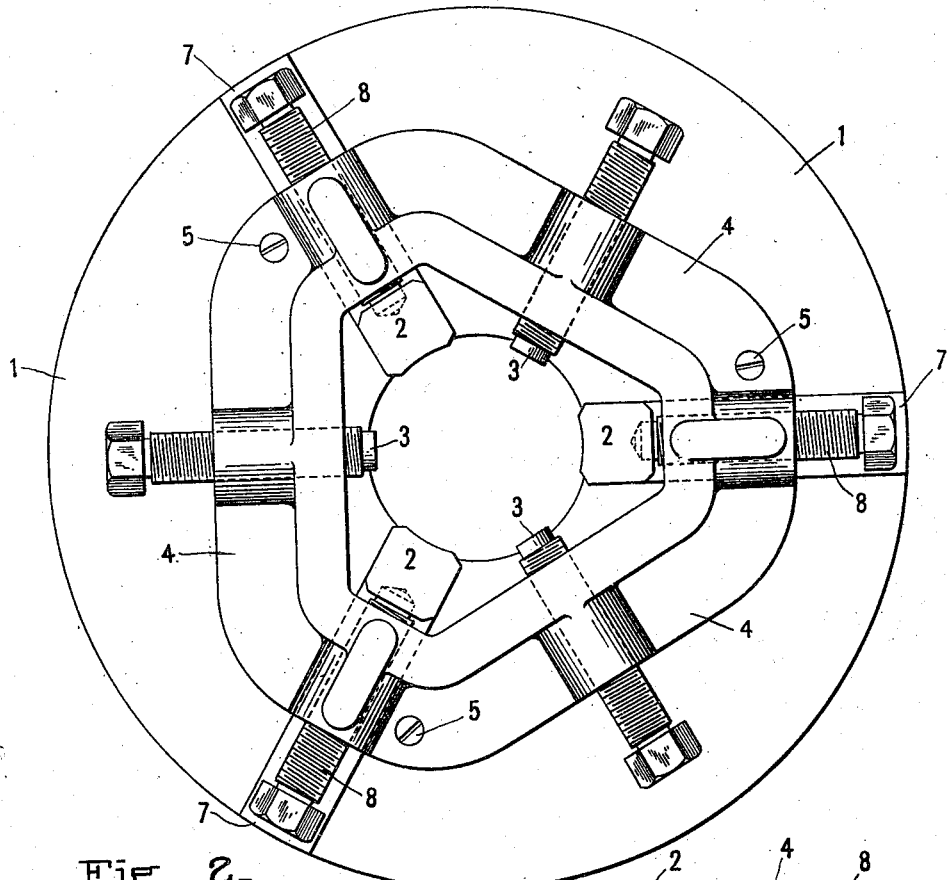
Figure 2:
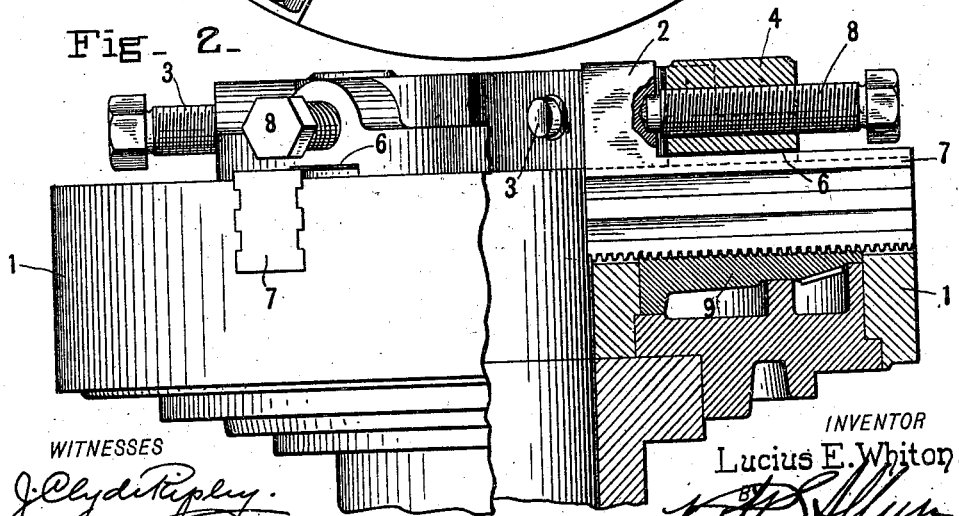
Figure 3:
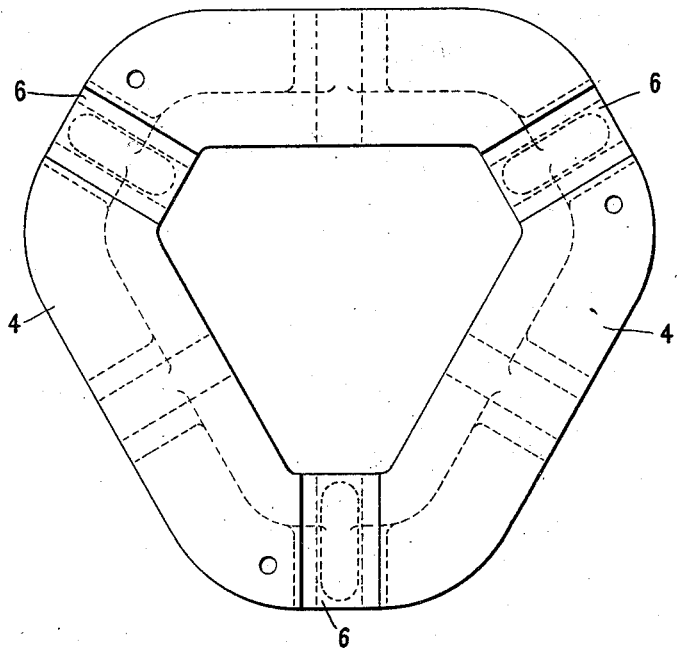
Figure 4:
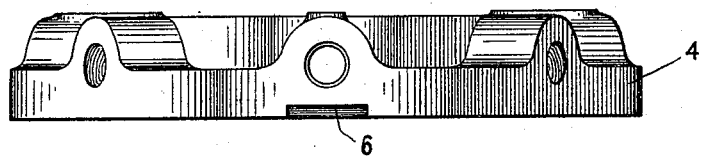
Figure 5:
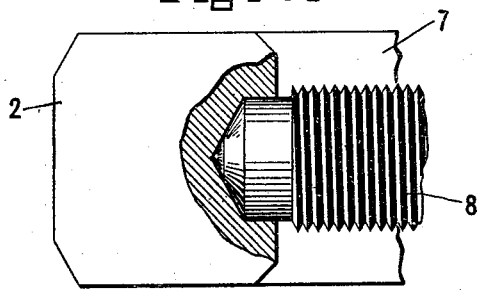
Figure 6:
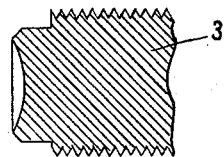

Figure 1, is a face view of a chuck with my improvements. Fig. 2, is a partial side view and section of the same. Fig. 3, is a back view of the frame. Fig. 4, is a side view of the same. Fig. 5, is a detail view of the end of a jaw partly in section. Fig. 6, is a detail view of the end of an auxiliary clamping screw.

I have shown the invention as applied to a universal jawed chuck with scroll adjustment. The body 1, has the regular jaws 2, 2, 2 adjusted as is customary in this type of chuck. Between the jaws are located auxiliary clamping screws 3, 3, 3, which are carried by a frame 4. This frame is secured at a convenient point or points as at 5, 5, to the chuck body so as to allow the frame and body to expand and contract without injury to either. The back of the frame lies snugly against the body, except where it is recessed as at 6, 6, 6, to allow for the projecting edges 7, 7, 7, of the chuck jaws thus torsionally connecting the frame to the jaws. In this way substantially all of the torsional strain applied through the screws 3, 3, 3, is taken up by the jaws.

After the screws 3, 3, 3, are tightened, the screws 8, 8, 8 are set up so as to reinforce the jaws 2, 2, 2, and the action of the adjusting scroll 9. The sides of the frame 4, being straight between the set screws 8, 8, 8 afford beam like truss actions so that the radial pressure of the jaws is thus increased without straining the chuck body or the scroll. The jaws may be recessed to receive the ends of the screws as 8 in Fig. 5. The clamping screws are properly shaped on the ends as shown in Fig. 6 to afford good gripping action.

What I claim is:

1. In a chuck construction, a body, a series of jaws a frame surrounding the jaws and reinforcing them at the rear and auxiliary clamping members carried by said frame, acting independently of said jaws.

2. In a chuck, a body, a series of jaws, a frame torsionally connected with said jaws and auxiliary clamping means carried by said frame.

3. In a chuck, a body, clamping jaws carried thereby, a frame carried by the body, auxiliary clamping means carried by the frame, and set screws carried by the frame coöperating with the jaws.

4. In a chuck, a body, jaws projecting therefrom, a frame recessed to receive said jaws, and auxiliary clamping means carried by said frame between the jaws.

5. In a chuck, a body, jaws carried thereby, a frame, means for securing said frame to the body and auxiliary clamping members carried by said frame and alternating with the jaws.

6. As an article of manufacture a chuck attachment comprising a frame, a plurality of clamping members carried thereby, and devices carried by the frame between the clamping members for coacting with the chuck jaws.

7. As an article of manufacture a chuck attachment comprising an angular frame adapted to surround and receive the ends of the chuck jaws, clamping devices carried by said frame adapted to coact with the jaws in the angles of the frame and clamping members adapted to engage the work.

8. In a chuck, a body, a plurality of clamping jaws adjustable to and from the center, a frame surrounding the ends of the jaws for reinforcing them means for securing the frame to the body and means carried by said frame for independently engaging the different jaws.

9. As an article of manufacture, a chuck attachment comprising, a frame adapted to surround the chuck jaws, means carried thereby for engaging the chuck jaws and means carried thereby between said engaging means for engaging and centering the work.

10. As an article of manufacture, a chuck attachment comprising, a frame having jaw receiving grooves in its back and jaw engaging set screws carried by said frame substantially parallel with said grooves.

11. As an article of manufacture, a chuck attachment comprising, a frame having jaw receiving grooves in its back and jaw engaging set screws carried by said frame substantially parallel with said grooves and work engaging screws carried by said frame between said jaw engaging screws.

12. In a chuck, a body, a plurality of clamping jaws carried thereby and adjustable radially thereto, a frame surrounding said jaws, clamping devices carried by said frame for reinforcing said jaws and work engaging devices located between said jaw clamping devices.

13. A chuck comprising, a body, a set of jaws carried thereby, means for simultaneously adjusting said jaws, a frame secured to said body and surrounding and reinforcing said jaws and independently adjustable work engaging devices carried by said frame between said jaws.

14. In a chuck, a body, adjustable jaws carried thereby, a reinforcing frame secured to said body and extending over said jaws and jaw clamping screws carried by said frame.

In testimony whereof I affix my signature in presence of two witnesses.

LUCIUS E. WHITON.

Witnesses:
L. G. STEBBINS,
J. H. GUMBLE.